Sept. 25, 1956  J. W. RUNNER  2,764,265
APPARATUS FOR EXTRACTING HEAT FROM BRAKES
AND IMPROVING THE OPERATION THEREOF
Filed Dec. 22, 1953
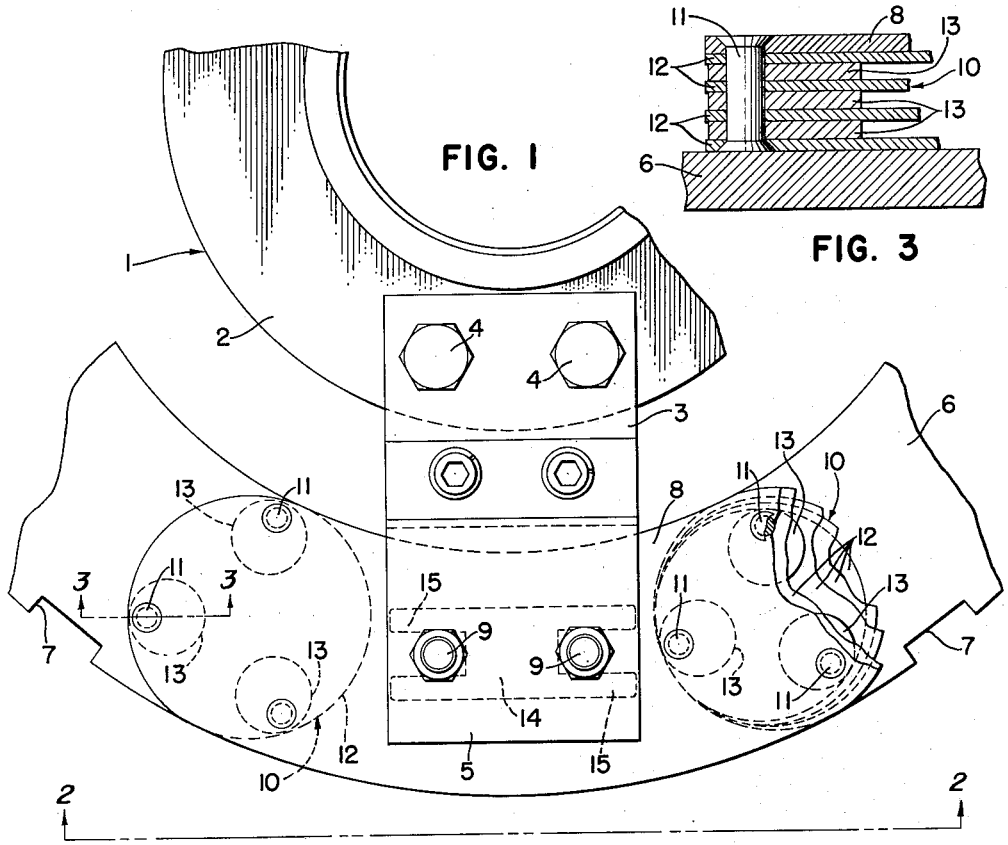
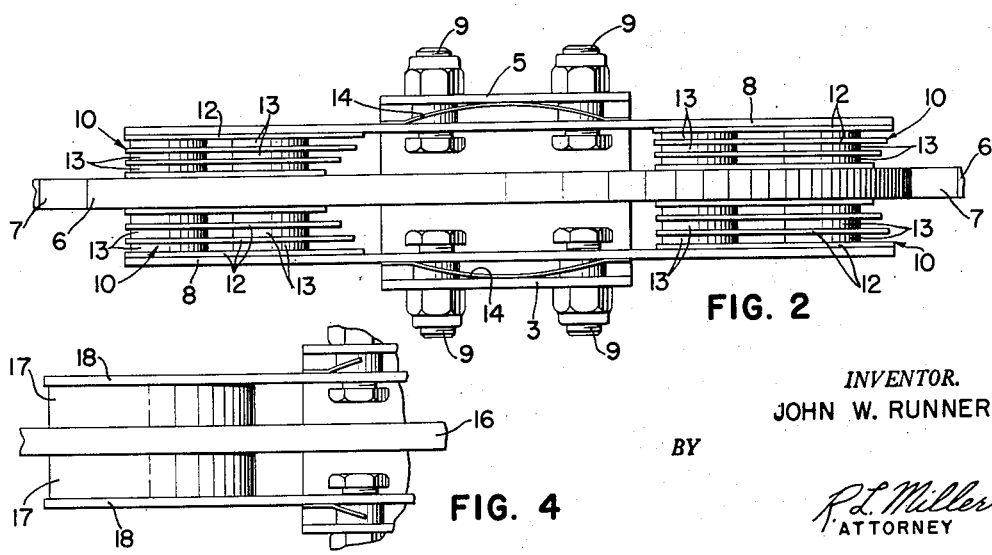
INVENTOR.
JOHN W. RUNNER
BY
P. L. Miller
ATTORNEY

United States Patent Office 2,764,265
Patented Sept. 25, 1956

2,764,265

APPARATUS FOR EXTRACTING HEAT FROM BRAKES AND IMPROVING THE OPERATION THEREOF

John W. Runner, Akron, Ohio, assignor to The Goodyear Tire & Rubber Company, Summit County, Ohio, a corporation of Ohio Application December 22, 1953, Serial No. 399,792

7 Claims. (Cl. 188—264)

This invention relates to brakes, and especially is concerned with means for extracting heat from brake means while cleaning or scavenging the friction surfaces of the brake and applying beneficial material thereto for increasing the coefficient of friction in the brake.

In brake operation, it is well known that great amounts of heat are produced in very small periods of brake actuation. This large amount of heat produced results in quite high operating temperatures for brakes when they are used to provide a rapid stop, or other effective braking action. High operational temperatures result in accelerated wear of the brake lining means and hence brake housings in some instances have heretofore been provided with integral cooling fins to aid in dissipating heat generated in brake operation. However, insofar as I am aware, none of such prior attempts to cool brakes by any types of cooling fins has been completely satisfactory in operation and very rapid brake wear occurs in many instances.

The general object of the present invention is to provide new and improved apparatus for extracting heat from brakes while the apparatus also is characterized by its ability to clean friction surfaces in the brake and to apply material for improving the coefficient of friction to such surfaces.

Another object of the invention is to provide a brake construction wherein a member is provided for sliding contact with a surface of a brake member to withdraw heat from the brake member and to enable the brake to reduce its maximum operating temperatures.

A further object of the invention is to provide a member in a brake for sliding contact with a braked surface for improving the frictional co-efficient of such surface to accelerate brake action in the brake.

Another object of the invention is to provide a laminated or unitary metal disc in a brake, which disc is resiliently urged into contact with a moving brake member, such as a brake disc, for constantly cleaning the brake disc surface and applying frictional material thereto.

A further object of the invention is to provide apparatus of the type described which is of sturdy construction and is adapted to have a long, operative service life with a minimum of maintenance thereon, which apparatus automatically compensates and adjusts for wear as it occurs.

The foregoing and other objects and advantages of the invention will be made more apparent as the specification proceeds.

For a better understanding of the details of the invention, reference should be had to the accompanying drawings, wherein:

Fig. 1 shows a side elevation of a fragment of a brake which has heat extracting apparatus embodying the principles of the invention in operative association therewith;

Fig. 2 is a bottom plan of the apparatus of Fig. 1 taken on line 2—2 thereof;

Fig. 3 is an enlarged fragmentary section on line 3—3 of Fig. 1; and

Fig. 4 is a bottom plan of a modification of the brake of the invention.

In referring to the accompanying drawings and the following specification, corresponding numerals are used to refer to corresponding parts in the drawing and specification to facilitate comparison therebetween.

The present invention in general relates to a brake assembly wherein a support member is provided, a pair of carrier plates are slidably secured to the support member in spaced but opposed relation for receipt of the brake disc therebetween, and laminated metal disc and spacer units are secured to the carrier plates and positioned for engaging the sides of the brake disc to clean and treat the brake disc surfaces and to withdraw heat from the brake disc by conduction. The laminated units each usually include a plurality of thin metal discs and relatively small diameter spacers positioned intermediate the metal discs for spacing them while other conventional means secure the spacers and discs into an operative unit. These laminated units are urged into engagement with the brake disc by suitable spring means for extracting heat from the brake discs.

Attention now is particularly directed to the details of the structure shown in the drawings, and a brake assembly is shown and is indicated as a whole by the numeral 1. This brake assembly includes a suitable housing 2 positioned in a stationary manner in the brake assembly by suitable means (not shown). The housing member 2 is provided with a radially extending hanger member 3 having an axially offset portion and secured thereto as by means of bolts or cap screws 4. This hanger member 3 has a second plate or similar device 5 oppositely offset and secured thereto as by cap screws so that a bifurcated end section is provided on the lower end of the hanger member 3. The end section formed by the hanger member 3 and the plate 5 is adapted to have a brake disc or ring 6 positioned intermediate opposed, spaced portions of such hanger member and plate, as best shown in Fig. 2 of the drawing. This brake disc or ring 6 has notches or recesses 7 provided in peripheral portions thereof for engaging suitable splines (not shown) provided on or carried by the wheel (not shown) positioned by the housing 2 and rotatably supported thereon. The splined engagement of the brake disc 6 with its positioning means permits limited axial movement of such brake disc on application of braking forces thereto. These braking forces are provided by conventional spot type of brake means carried by circumferentially spaced portions of the brake housing 2, usually diametrically opposed to the hanger member 3.

The hanger member 3 and the plate 5 each has a carrier plate 8 adjustably secured thereto, as by pairs of shouldered bolts 9 fixedly secured to the members 3 and plates 5 respectively, and engaged in apertures of each carrier plate 8. Thus the carrier plates are fixedly positioned against circumferential movement on the hanger member 3 and plate 5 but have limited movement in a direction parallel to the axis of the brake housing 2.

As an important feature of the invention, the carrier plates 8 each position one or more laminated metal disc and spacer units indicated as a whole by the numeral 10. These laminated units 10 have the components thereof secured together, and the laminated unit itself secured to the carrier plate by suitable means, such as metal rivets 11. These rivets 11 extend through the carrier plates 8 as well as the laminated units 10, as best indicated in Fig. 3.

The laminated units 10 preferably comprise a plurality of metal discs 12 positioned in spaced relationship to each other by means of metal spacers 13. The metal spacers 13 usually are of relatively small diameters with relation to the diameters of the metal discs 12, and the spacers may be thicker than the metal discs 12, if desired, so that the metal discs 12 are positioned in appreciably spaced relationship to each other to expose relatively great areas of the metal discs for cooling action by radiation. Figs. 1 and 3 of the drawings best bring out the fact that a plurality of the metal spacers 13 may be positioned in circumferentially spaced relation intermediate each adjacent pair of the metal discs 12 so that a relatively sturdy laminated unit is provided. This laminated unit, as a further feature of the invention, has a relatively hollow construction with open flue portions provided therein to facilitate free circulation of air therethrough for cooling the laminated unit by convection.

Fig. 2 of the drawings best shows that usually a plurality of pairs of the laminated units 10 are positioned in opposed relationship on opposite sides of the brake disc 6 for contacting such brake disc at circumferentially spaced portions thereof to aid in extracting heat therefrom.

In order to urge the laminated units 10 into contact with the brake disc 6, relatively light weight leaf springs 14 are shown compressed intermediate the hanger member 3 and the associated carrier plate 8 positioned thereby and the plate 5 and its carrier plate 8, so that the carrier plates are continually lightly urged towards the brake disc 6 to bring the laminated units into frictional engagement therewith. Thus on brake operation, the contact between the brake disc 6 and the laminated units will cleanse and process the disc surfaces and will withdraw heat from the brake disc by conduction due to the relatively large surface areas of the laminated units in engagement with the brake disc. Such heat then will be cleared relatively rapidly from the laminated units due to the cooling thereof by radiation and by convection due to air currents circulating through such units. The spring 14 have bifurcated ends 15 that engage the shanks of the bolts 9 to retain the springs in their assembled positions.

In a modified type of brake assembly of the invention, a brake disc or plate 16 is shown and it has cooling discs or blocks 17 positioned to engage opposite faces of the brake member or disc 16 by members, such as carrier plates 18. The carrier plates 18 can be positioned in a manner similar to the carrier plates 8 shown in Figs. 1 through 3 of the drawings.

The laminated units 10, or cooling blocks 17 may be made from any suitable highly heat conductive metal. Thus copper and some of its alloys, such as lithium copper, are especially suited for use in making such units or blocks, whereas the other components of the brake assembly may be made from any suitable metallic material.

It will be realized that in effect, the laminated units 10 provide a finned cooling unit and in some instances, it may be desirable to make such unit of an integral construction and wherein only one centrally positioned spacer would be provided intermediate each of the pairs of adjacent disc or fin means formed on axially spaced portions of such cooling member. In other words, peripherally formed grooves could be provided on the cooling blocks 17 to provide greater area thereon for cooling the block by radiation.

In tests made of brake assemblies embodying the principles of the invention, it has been found that the brakes of the invention when tested under similar operating conditions with prior conventional types of brakes operated under lower temperatures than the conventional brakes. Likewise, it has been found that copper, when used in the laminated units 10 or blocks 17, not only continually cleaned the surface of the brake disc 6, but that they also continually provide a light deposit of metal particles on the surface of such brake disc and have increased the coefficient of friction of such brake disc. Of course, braking action is rendered more effective by such increase in the coefficient of friction of the brake disc so that yet a further operational advantage is secured by use of the brake assembly means of the invention.

The invention is primarily adapted for use with airplane brakes wherein the wheels of the airplane operate only upon landings and take offs and wherein the very small drag provided by the heat scavenging means is not objectionable. Also, it is a characteristic of airplane brakes that extremely large amounts of heat energy must be absorbed in very short periods of time. Thus, the heat scavenging means of the invention, particularly the form of the invention shown in Fig. 4 serve as a heat sink or storage means more than as cooling or heat dissipating means during the relatively short duration of the brake stop. For example, the heat developed during braking is conducted into the scavenging means 10 or 17 faster than into the steel or iron discs 6 or 16. This is because the heat conductivity of copper is about eight times greater than that of steel or iron.

It will be realized that other means than the springs 14 can be used for urging the laminated cooling units or similar members into engagement with a brake disc or other brake member. However, it is very desirable to have only a very light force applied to such heat exchanger member to avoid setting up excessive drag on the wheel with which such brake disc 6 is associated when no braking action is desired, such as when taking off, or taxiing around the field. Furthermore, by the use of only light contact between the heat exchanger units and the brake disc means, no excessive wear is set up on the heat exchange members and they have a long, effective service life. The brake assembly is adapted to operate at reduced temperatures and give efficient braking action. Thus it is contended that a novel effective brake assembly has been provided and that the objects of the invention have been achieved.

While a certain representative embodiment and details have been shown for the purpose of illustrating the invention, it will be apparent to those skilled in this art that various changes and modifications may be made therein without departing from the spirit or scope of the invention.

What is claimed is:

1. In a brake assembly of the type in which brake shoes engage a rotatable disc to provide the braking force, a support member, a pair of carrier plates, means slidably securing said carrier plates to said support member in spaced but opposed relation, a brake disc positioned between said carrier plates, and laminated metal heat conducting disc and spacer units secured to said carrier plates and positioned for engaging the sides of said brake disc to withdraw heat developed by friction of the brake shoes with the disc from the brake disc by conduction, said laminated units each including a plurality of thin metal discs, and relatively small area spacers positioned intermediate said metal discs to position said metal discs in spaced relation to provide a laminated unit having exposed metal discs therein for cooling of said metal discs by radiation and with said units having open portions for cooling the discs by convection.

2. In a brake-assembly of the type in which brake shoes engage a rotatable disc, a support member, a pair of carrier plates, means slidably securing said carrier plates to said support member in spaced but opposed relation, a brake disc positioned between said carrier plates, laminated metal heat conducting disc and spacer units secured to said carrier plates and positioned for engaging the sides of said brake disc to withdraw heat developed by friction of the brake shoes with the disc from the brake disc conduction, said laminated units each including a plurality of thin metal discs, and relatively small area spacers positioned intermediate said metal discs to position said metal discs in spaced relation to provide a laminated unit having exposed metal discs therein for cooling of said metal discs by radiation and with said units having open portions for cooling the discs by convection, and means for urging said laminated units into light friction contact with said brake disc.

3. In a brake assembly of the type in which brake shoes engage a rotatable disc to provide the braking force, a support member, a pair of carrier plates, means slidably securing said carrier plates to said support member in spaced but opposed relation for receipt of a brake disc therebetween, and laminated copper containing heat conductive metal disc and spacer units secured to said carrier plates and positioned for engaging the sides of a brake disc to withdraw heat from the brake disc by conduction, said laminated units each including a plurality of thin metal discs, relatively small area spacers positioned intermediate said metal discs, and metal rivets securing said spacers and discs together to provide a laminated unit having exposed metal discs for cooling by radiation and with said units having open portions for cooling the discs by convection.

4. In a brake assembly of the type in which brake shoes engage a rotatable disc to provide the braking force, housing means, a hanger member having a bifurcated end section, a pair of carrier plates, means slidably securing said carrier plates to the end section of said hanger member in spaced but opposed relation for receipt of a brake disc therebetween, and laminated copper containing discs and spacer units having the discs positioned in spaced edge exposed relation secured to said carrier plates and positioned for engaging the sides of a brake disc for withdrawing heat therefrom and for exerting a cleaning action thereon.

5. In a brake assembly of the type in which brake shoes engage a rotatable disc to provide the braking force, housing means, a hanger member having a bifurcated end section secured to said housing means, a pair of carrier plates, means slidably securing said carrier plates to oppose inner portions of the end section of said hanger member for receipt of a brake disc therebetween, and a metal disc unit having fin means thereon secured to each of said carirer plates and positioned in opposed relation for engaging the sides of a brake disc to reduce the operating temperature of the brake disc and for exerting a cleaning action thereon.

6. In a brake having a rotatable brake disc and brake members engageable therewith, a brake member for contact with the brake disc, a positioning member, said members being positioned for relative movement therebetween, a plurality of laminated metal disc contact means for sliding contact with opposed portions of said brake disc, said laminated metal disc contact means including relatively small diameter metal spacers intermediate the metal discs to expose relatively large metal disc areas for cooling action by radiation and convection, means for securing said contact means to said positioning member, and means for urging asid contact means into light brushing contact with said brake disc to aid in withdrawing heat therefrom.

7. In a brake having a rotatable brake disc and brake members engageable therewith, a brake member for contact with the brake disc, a positioning member, said rotatable brake disc and said positioning member being positioned for relative rotary movement therebetween, a high heat conductivity metal contact means for sliding contact with the said brake disc, said contact comprising spaced apart metal discs providing through air spaces therebetween open in the direction of rotation of the brake means for securing said contact means to said positioning member, and means for urging said contact means into contact with said brake disc to aid in withdrawing heat therefrom and to improve the frictional coefficient thereof.

References Cited in the file of this patent

UNITED STATES PATENTS

| | | |
|---|---|---|
| 880,266 | Ast | Feb. 25, 1908 |
| 1,780,194 | Kende | Nov. 4, 1930 |
| 1,808,511 | Robbins | June 2, 1931 |
| 1,923,872 | Loughead | Aug. 22, 1933 |
| 2,206,381 | Zimmerman | July 2, 1940 |
| 2,295,503 | Miller | Sept. 8, 1942 |
| 2,466,990 | Johnson et al. | Apr. 12, 1949 |
| 2,560,015 | Waldron | July 10, 1951 |
| 2,713,923 | Eksergian et al. | July 26, 1955 |